United States Patent
Yamazaki

(10) Patent No.: US 9,769,327 B2
(45) Date of Patent: Sep. 19, 2017

(54) IMAGE FORMING APPARATUS AND METHOD OF POSITIONAL ADJUSTMENT IN IMAGE FORMATION

(71) Applicant: Tomoyoshi Yamazaki, Tokyo (JP)

(72) Inventor: Tomoyoshi Yamazaki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/721,511

(22) Filed: May 26, 2015

(65) Prior Publication Data
US 2015/0356382 A1    Dec. 10, 2015

(30) Foreign Application Priority Data

Jun. 5, 2014  (JP) .................................. 2014-116690

(51) Int. Cl.
*G06K 15/00* (2006.01)
*H04N 1/00* (2006.01)
(Continued)

(52) U.S. Cl.
CPC ............... *H04N 1/00* (2013.01); *B65H 7/10* (2013.01); *B65H 9/106* (2013.01); *B65H 85/00* (2013.01); *G03G 15/6564* (2013.01); *B65H 2404/1424* (2013.01); *B65H 2511/222* (2013.01); *B65H 2511/242* (2013.01); *B65H 2553/82* (2013.01); *B65H 2701/1315* (2013.01);
(Continued)

(58) Field of Classification Search
None
See application file for complete search history.

(56) References Cited

U.S. PATENT DOCUMENTS

| 8,577,278 | B2 * | 11/2013 | Inoue | G03G 15/5029 |
| | | | | 399/394 |
| 2003/0037689 | A1 * | 2/2003 | Dreher | B41F 33/0081 |
| | | | | 101/485 |

(Continued)

FOREIGN PATENT DOCUMENTS

| JP | 2001-121774 | 5/2001 |
| JP | 2002-006718 | 1/2002 |

(Continued)

*Primary Examiner* — Vincent Rudolph
*Assistant Examiner* — Michael Burleson
(74) *Attorney, Agent, or Firm* — Harness, Dickey & Pierce, P.L.C.

(57) ABSTRACT

An image forming apparatus, in which a method of positional adjustment performed in image forming, includes an image bearer, a transfer device to transfer an image formed on the image bearer onto a recording medium having a first side and a second side, a recording medium conveying path along which the recording medium travels to the transfer device, a first detector and a second detector to detect positional information of the recording medium on or near the recording medium conveying path, in which the first detector being disposed closer to the transfer device than the second detector to the transfer device in a sheet conveying direction on the recording medium conveying path, and an adjuster to adjust a position of the image based on at least one of former positional information obtained by the first detector and current positional information obtained by the second detector.

19 Claims, 7 Drawing Sheets

(51) Int. Cl.
  *B65H 85/00* (2006.01)
  *B65H 7/10* (2006.01)
  *B65H 9/10* (2006.01)
  *G03G 15/23* (2006.01)
  *G03G 15/00* (2006.01)

(52) U.S. Cl.
  CPC ....... *B65H 2801/03* (2013.01); *G03G 15/234* (2013.01); *G03G 15/6561* (2013.01); *G03G 2215/00721* (2013.01)

(56) References Cited

U.S. PATENT DOCUMENTS

| | | | |
|---|---|---|---|
| 2004/0190920 A1* | 9/2004 | Engeln | B41F 33/0081 399/49 |
| 2013/0168210 A1 | 7/2013 | Yamazaki et al. | |
| 2013/0308992 A1* | 11/2013 | Suzuki | G03G 15/16 399/341 |
| 2013/0334769 A1 | 12/2013 | Yamazaki | |

FOREIGN PATENT DOCUMENTS

| | | |
|---|---|---|
| JP | 2006-206195 | 8/2006 |
| JP | 2012-162350 | 8/2012 |
| JP | 2012-180145 | 9/2012 |
| JP | 2013-151369 | 8/2013 |
| JP | 2014-015335 | 1/2014 |
| JP | 2014-172745 | 9/2014 |

* cited by examiner

IMAGE FORMING APPARATUS AND METHOD OF POSITIONAL ADJUSTMENT IN IMAGE FORMATION

CROSS-REFERENCE TO RELATED APPLICATIONS

This patent application is based on and claims priority pursuant to 35 U.S.C. §119(a) to Japanese Patent Application No. 2014-116690, filed on Jun. 5, 2014, in the Japan Patent Office, the entire disclosure of which is hereby incorporated by reference herein.

BACKGROUND

Technical Field

This disclosure relates to an image forming apparatus that corresponds to a copier, facsimile machine, printer, printing machine, and a multi-function peripheral including at least two functions of the copier, facsimile machine, printer, and printing machine to adjust a position of a recording medium, and a method of positional adjustment in image formation performed by the image forming apparatus.

Related Art

In image forming apparatuses that correspond to copiers, facsimile machines, printers, printing machines, and multi-function peripherals including at least two functions of the copier, facsimile machine, printer, and printing machine, a side fence is provided to align a recording medium in a width direction. In consideration of variation of measurements in recording media, the side fence has a margin with respect to a reference width of the recording medium. This margin of the side fence causes deviation of a position of the recording medium by a length of a gap between the recording medium and the side fence. When an image formed on an image bearer is transferred onto a recording medium, an image forming position on a sheet conveying path at which the image is transferred onto the recording medium is shifted.

In order to address this inconvenience, a known image forming apparatus employs a detector on a sheet conveying path to detect a position of a recording medium to prevent deflection of an image transfer position to the recording medium based on positional information of the recording medium.

For example, a known image forming apparatus includes an exposure device to optically write an image onto a photoconductor and a sensor. Based on positional information obtained by the sensor, an optical writing position of the exposure device is adjusted to correct the position of a toner image on a photoconductor. Accordingly, the position of the image to be transferred onto a recording medium at a transfer position.

For another example, a known image forming apparatus includes a duplex printing unit, by which a recording medium is shifted to correct an image transfer position.

SUMMARY

At least one aspect of this disclosure provides an image forming apparatus including an image bearer, a transfer device, a recording medium conveying path, a first detector, a second detector, and an adjuster. The transfer device transfers an image formed on the image bearer onto a recording medium having a first side and a second side. The recording medium conveying path is a path along which the recording medium travels to the transfer device. The first detector and the second detector detect positional information of the recording medium on or near the recording medium conveying path. The first detector is disposed closer to the transfer device than the second detector to the transfer device in a sheet conveying direction on the recording medium conveying path. The adjuster adjusts a position at which the recording medium receives the image formed on the image bearer based on at least one of former positional information obtained by the first detector in a previous image formation and current positional information obtained by the second detector in a present image formation.

Further, at least one aspect of this disclosure provides a method of positional adjustment in image formation including detecting positional information of a recording medium at a first position in a recording medium conveying path in a first image formation, detecting positional information of the recording medium at a second position arranged downstream from the first position in the recording medium conveying path in a second image formation, and adjusting a position of image formation at which the recording medium receives an image in the second image formation, based on at least one of the positional information detected in the first image formation and the positional information position detected in the second image formation.

DETAILED DESCRIPTION

Figure 1:
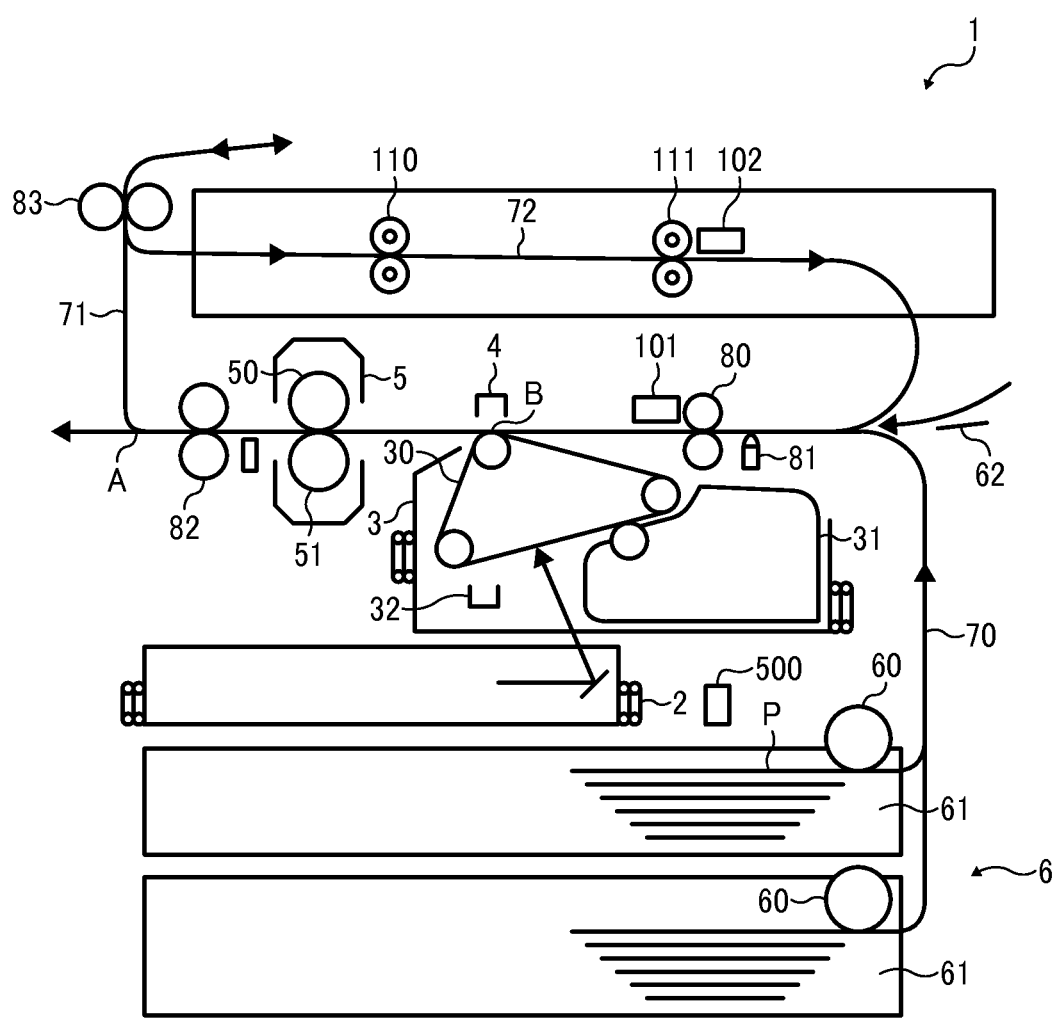
FIG. 1 is a drawing illustrating a schematic configuration of an image forming apparatus according to an example of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Now, a description is given of an image forming apparatus 1 according to an example of this disclosure.

The image forming apparatus 1 performs duplex printing with respect to a recording sheet P. Specifically, the image forming apparatus 1 prints an image on a front of the recording sheet P, which is a first image forming surface, and a back of the recording sheet P, which is a second image forming surface. In duplex printing, the image forming apparatus 1 adjusts an image forming position on the back of the recording sheet P with respect to the front of the recording sheet P.

FIG. 1 is a drawing illustrating a schematic configuration of the image forming apparatus 1.

As illustrated in FIG. 1, the image forming apparatus 1 includes an optical writing device 2, an image forming part 3, a transfer device 4, a fixing device 5, a sheet feeding part 6, a sheet discharging part, a sheet conveying path 70, a sheet switching path 71, a sheet reversing path 72, and a sheet discharging roller pair 82. The image forming part 3 includes a photoconductor belt 30, a developing device 31, and a charger 32. The sheet discharging part is disposed downstream from the sheet discharging roller pair 82 in a sheet conveying direction of the recording sheet P. Each of the sheet conveying path 70, the sheet switching path 71, and the sheet reversing path 72 functions as a recording medium conveying path to convey the recording sheet P. The sheet feeding part 6 includes sheet feed rollers 60 and sheet trays 61.

It is to be noted that, in this disclosure, both of the first shift roller pairs 110 and the second shift roller pairs 111 have respective configurations with multiple roller pairs. To be more specific, the configuration according to this example includes two first shift roller pairs 110 and two second shift roller pairs 111. However, the configuration of the shirt roller pair is not limited thereto and a configuration including one or a single shift roller pair or three or more shift roller pairs are also applicable to this disclosure.

The image forming apparatus 1 further includes first shift roller pairs 110 and second shift roller pairs 111, both functioning as an adjuster. The first shift roller pairs 110 and the second shift roller pairs 111 are disposed on the sheet reversing path 72.

The image forming apparatus 1 further includes a first sensor 101 and a second sensor 102. The first sensor 101 that functions as a first detector is disposed on the sheet conveying path 70. The second sensor 102 that functions as a second detector is disposed on the sheet reversing path 72.

As an image forming operation starts, the photoconductor belt 30 that functions as an image bearer starts rotating so that the charger 32 uniformly charges a surface of the photoconductor belt 30. The optical writing device 2 emits laser light based on image data obtained by an image acquiring device to the surface of the photoconductor belt 30. By so doing, an electrostatic latent image is formed on the surface of the photoconductor belt 30.

After being irradiated with laser light by the optical writing device 2, the photoconductor belt 30 is supplied with toner by the developing device 31. The toner functions as developer used to develop the electrostatic latent image formed on the surface of the photoconductor belt 30 into a visible toner image.

In optical writing performed by the optical writing device 2, a polygon motor provided in the optical writing device 2 rotates a polygon mirror to reflect the laser light onto the surface of the photoconductor belt 30 to scan an area along a direction corresponding to a width of the recording sheet P.

In addition, as the image forming operation starts, one of the sheet feed rollers 60 provided at a lower part of the image forming apparatus 1 is selectively driven to rotate, so that the recording sheet P accommodated in one of the sheet trays 61, which is selected corresponding to the selected sheet feed roller 60, is fed to the sheet feeding path 70. The image forming apparatus 1 further includes a registration roller pair 80 and a registration sensor 81. The registration sensor 81 is disposed before the registration roller pair 80 in the sheet conveying direction. As the recording sheet P travels the sheet conveying path 70, the registration sensor 81 detects that the leading end of the recording sheet P has reached a detection position of the registration sensor 81.

It is to be noted that the recording sheet P is alternatively fed from a bypass tray 62.

The toner image formed on the surface of the photoconductor belt 30 is transferred onto the recording sheet P by the transfer device 4 at an image transfer position B. The registration roller pair 80 controls a timing to convey the recording sheet P to the image transfer position B. In synchronization with movement of the toner image formed on the surface of the photoconductor belt 30, the recording sheet P is conveyed to the transfer device 4 to the image transfer position B. The recording sheet P conveyed to the transfer device 4 receives the toner image from the photoconductor belt 30 at the image transfer position B.

The recording sheet P having the toner image on the surface thereof is then conveyed to the fixing device 5 that includes a fixing roller 51 and a pressure roller 50. The fixing roller 51 is heated by a heater. On reaching the fixing device 5, the recording sheet P is heated and pressed so that the toner image is fixed to the recording sheet P. The recording sheet P having the fixed toner image on the surface thereof is separated from the fixing roller 51 and is discharged to a sheet discharging tray by the sheet discharging roller pair 82.

When the image forming apparatus 1 performs duplex printing, the recording sheet P changes its direction toward the sheet switching path 71 at a switching point A located in the middle of sheet conveyance from the sheet discharging roller pair 82 to the sheet discharging tray.

The image forming apparatus 1 further includes a reverse roller pair 83. The recording sheet P conveyed to the sheet switching path 71 is conveyed to the reverse roller pair 83. After the leading end of the recording sheet P has passed the reverse roller pair 83 and before the trailing end of the recording sheet P reaches the reverse roller pair 83, the reverse roller pair 83 reversely rotates. By so doing, the recording sheet P is conveyed in an opposite direction to the sheet conveying direction toward the sheet reversing path 72.

As previously described, the sheet reversing path 72 has the first shift roller pairs 110 and the second shift roller pairs 111 thereon, where the recording sheet P travels thereby. The recording sheet P that is reversed is conveyed to the sheet conveying path 70 again to perform image formation on the back of the recording sheet P.

In the sheet conveying direction of the recording sheet P, the first sensor 101 is disposed immediately downstream from the registration roller pair 80 on the sheet conveying path 70 and the second sensor 102 is disposed immediately downstream from the second shift roller pairs 111.

The first sensor 101 and the second sensor 102 detect a position in a width direction (in a direction perpendicular to the sheet conveying direction of the recording sheet P and in a back side of the paper on which FIG. 1 is drawn) of the recording sheet P that is conveyed thereto. Further, in the sheet conveying direction, the first sensor 101 is disposed closer than the second sensor 102 to the transfer device 4, so as to detect positional information of the recording sheet P before the toner image is transferred.

Further, the first shift roller pairs 110 and the second shift roller pairs 111 are designed to move in the width direction of the recording sheet P. By shifting the recording sheet P that is sandwiched between the first shift roller pairs 110 and the second shift roller pairs 111 in the width direction of the recording sheet P, the position of the recording sheet P in the width direction thereof can be adjusted.

A description is given of how to adjust the image forming position when forming an image on the recording sheet P.

In this example, an adjuster corrects the position of the recording sheet P. Specifically, the position of a second recording sheet P and those of any subsequent sheets are corrected based on a detected position of the recording sheet P on which a previous image is formed.

It is to be noted that the adjuster in this example corresponds to the first shift roller pairs 110 and the second shift roller pairs 111.

Figure 2:
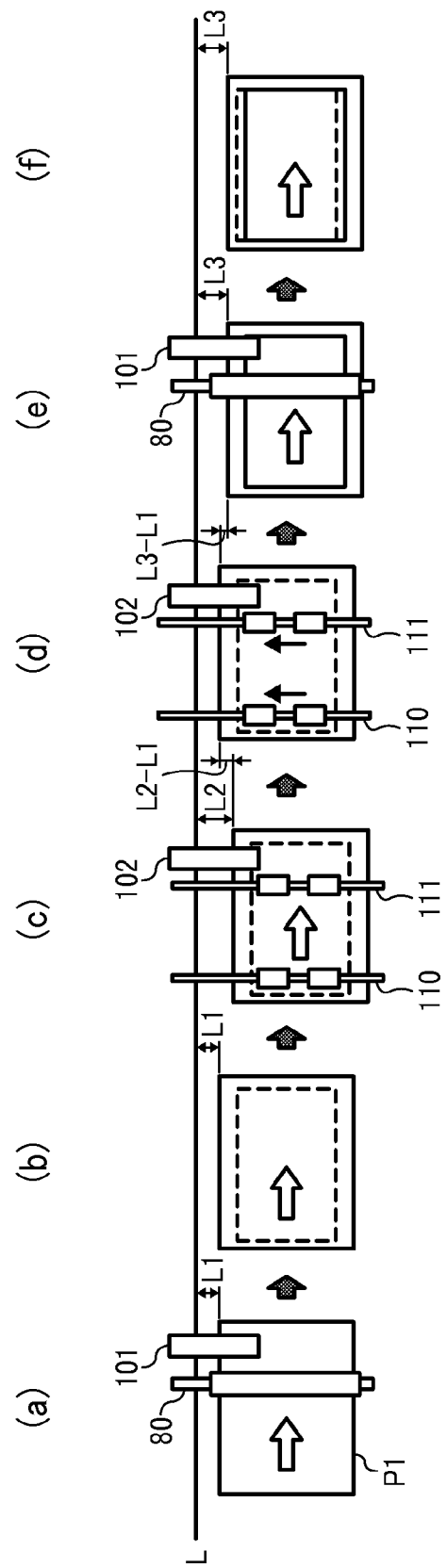
FIG. 2 is a drawing illustrating how the image forming apparatus performs position adjustment of a recording medium.

FIG. 2 is a drawing illustrating how the image forming apparatus 1 performs positional adjustment of the recording sheet P.

As illustrated in (a) of FIG. 2, a first recording sheet P that is a preceding recording sheet fed from a selected sheet tray 61 is conveyed in the sheet conveying path 70 before reaching the detection position of the first sensor 101.

The first sensor 101 detects a position L1 in the width direction of the first recording sheet P1 before the image formed on the photoconductor belt 30 is transferred onto the front of the first recording sheet P1, as illustrated in (a) of FIG. 2.

It is to be noted that the position L1 indicates a position to which the first recording sheet P1 is displaced from a reference position L in the width direction thereof by an amount of positional deviation between the reference position L and the position L1. Therefore, in this disclosure, the position L1 represents an amount of positional deviation by which the first recording sheet P1 is shifted from the reference position L to the position L1 in the width direction by the amount of positional deviation. The definitions of different positions described below in this disclosure (i.e., positions L2 through L6) are the same as that of the position L1, except for respective positions shifted from the reference position L.

After completion of image formation on the front of the first recording sheet P1, the first recording sheet P1 is conveyed via the switching path 71 to the sheet reversing path 72, as illustrated in (b) of FIG. 2.

While the first recording sheet P1 that travels in the sheet reversing path 72 is sandwiched by the first shift roller pairs 110 and the second shift roller pairs 111, the second sensor 102 detects a position L2 of the first recording sheet P1, as illustrated in (c) of FIG. 2.

Then, the position L2 is compared with the position L1 detected before the image formation on the front of the first recording sheet P1 to obtain a difference between the position L1 and the position L2, which is hereinafter referred to as a difference (L2−L1). Based on the difference (L2−L1), the position of the first recording sheet P1 is adjusted by shifting the first recording sheet P1 by the corresponding amount in the width direction, as illustrated in (d) of FIG. 2. Specifically, the first shift roller pairs 110 and the second shift roller pairs 111 sandwiching the first recording sheet P1 therebetween move in the width direction of the first recording sheet P1 by the amount, i.e., the difference (L2−L1), so as to adjust the positional deviation of the first recording sheet P1.

Figure 3:
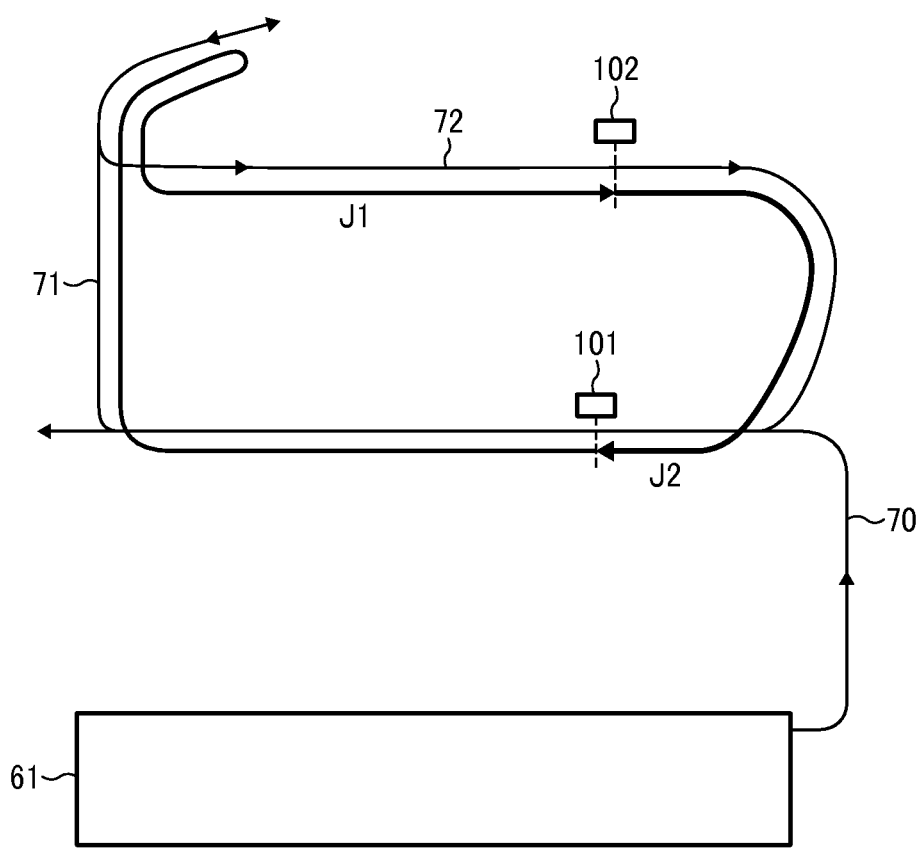
FIG. 3 is a drawing illustrating a range of position adjustment performed by the image forming apparatus.

The difference (L2−L1) indicates an amount of positional deviation of the first recording sheet P1 while the recording sheet P1 travels in a route indicated by arrow J1 in FIG. 3.

The first recording sheet P1 whose position has been adjusted based on the difference (L2−L1) is further conveyed in the sheet reversing path 72 where the first recording sheet P1 is reversed. The reversed first recording sheet P1 is then conveyed back to the sheet conveying path 70. Then, the first sensor 101 detects a position L3 in the width direction of the first recording sheet P1 before the image formed on the photoconductor belt 30 is transferred onto the back of the first recording sheet P1, as illustrated in (e) of FIG. 2. The position L3 indicates a position to which the first recording sheet P1 is displaced from the reference position L in the width direction thereof by that amount detected by the first sensor 101 in a duplex printing operation for the back of the first recording sheet P1. It is to be noted that the position L3 that is positional information detected by the first sensor 101 is not used for positional adjustment of the first recording sheet P1 on which the image has already been printed but is used for positional adjustment of a second recording sheet P2 that is a subsequent recording sheet conveyed after the first recording sheet P1.

The position L3 is compared with the position L1 detected before the image formation on the front of the first recording sheet P1 to obtain a difference between the position L1 and the position L3, which is hereinafter referred to as a difference (L3−L1). The difference (L3−L1) indicates an amount of positional deviation of the first recording sheet P1 while the recording sheet P1 travels in a route indicated by arrow J2 in FIG. 3.

After the position L3 is detected by the first sensor 101, the first recording sheet P1 further travels in the sheet conveying path 70. The image is then transferred onto the back of the first recording sheet P1 before the first recording sheet P1 is further conveyed to the sheet discharging part by the sheet discharging roller pair 82, as illustrated in (f) of FIG. 2.

Figure 4:
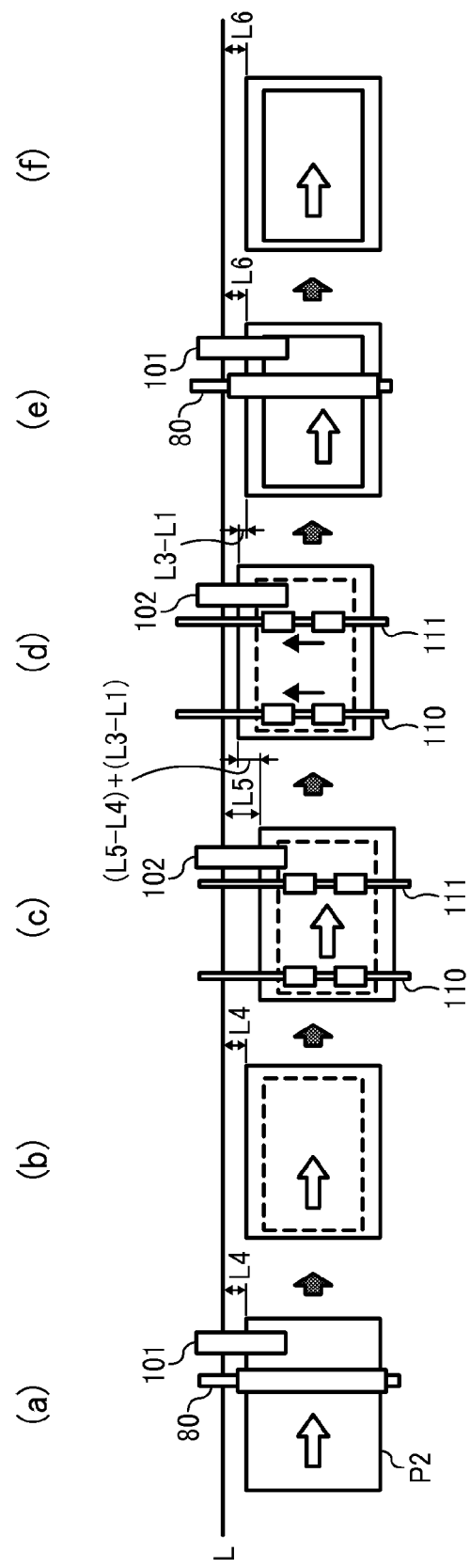
FIG. 4 is a drawing illustrating how the image forming apparatus performs position adjustment of another recording medium.

FIG. 4 is a drawing illustrating how the image forming apparatus 1 performs positional adjustment of the second recording sheet P2.

Similar to the first recording sheet P1, the second recording sheet P2 that is fed from the selected sheet tray 61 is conveyed in the sheet conveying path 70 before reaching the detection position of the first sensor 101. At the detection position, the first sensor 101 detects a position L4 in the width direction of the second recording sheet P2 before the image formed on the photoconductor belt 30 is transferred onto the front of the second recording sheet P2, as illustrated in (a) of FIG. 4.

After completion of image formation on the front of the second recording sheet P2, the second recording sheet P2 is conveyed via the switching path 71 to the sheet reversing path 72, as illustrated in (b) of FIG. 4. While the second recording sheet P2 that travels in the sheet reversing path 72 is sandwiched by the first shift roller pairs 110 and the second shift roller pairs 111, the second sensor 102 detects a position L5 of the second recording sheet P2, as illustrated in (c) of FIG. 4.

Here, the positions L1 and L3 detected during image formation of the first recording sheet P1 and the positions L4 and L5 detected during image formation of the second recording sheet P2 are used for performing positional adjustment of the second recording sheet P2. Specifically, the first shift roller pairs 110 and the second shift roller pairs 111 sandwiching the second recording sheet P2 therebetween move in the width direction thereof by an amount, i.e., a difference (L5−4)+(L3−L1), so as to adjust the positional deviation of the second recording sheet P2, as illustrated in (d) of FIG. 4.

The position L5 is compared with the position L4 detected before the image formation on the front of the second recording sheet P2 to obtain a difference between the position L4 and the position L5, which is hereinafter referred to as a difference (L5−L4). Here, the difference (L5−L4) indicates an amount of positional deviation of the second recording sheet P2 obtained while the second recording sheet P2 travels in the route J1 in FIG. 3, which corresponds to the difference (L2−L1) of the first recording sheet P1.

Further, as described above, the difference (L3−L1) indicates the amount of positional deviation of the first recording sheet P1 while the first recording sheet P1 travels in the route J2 illustrated in FIG. 3. For positional adjustment in the route J2, the difference (L3−L1) of the first recording sheet P1 is employed as a substitute to adjust the second recording sheet P2.

After completion of image formation on the front of the second recording sheet P2, the second recording sheet P2 is conveyed in the sheet reversing path 72 and the sheet conveying path 70. While the second recording sheet P2 that travels in the sheet conveying path 70, the first sensor 101 detects a position L6 of the second recording sheet P2, as illustrated in (e) of FIG. 4. The position L6 is used to adjust a position of a third recording sheet P3 that is a further subsequent recording sheet after the second recording sheet P2. After the image is formed on the back of the second recording sheet P2, the second recording sheet P2 is discharged to the sheet discharging tray, as illustrated in (f) of FIG. 4.

The position L6 is compared with the position L4 detected before the image formation on the front of the second recording sheet P2 to obtain a difference between the position L4 and the position L6, which is hereinafter referred to as a difference (L6−L4). The difference (L6−L4) indicates an amount of positional deviation of the second recording sheet P2 while the second recording sheet P2 travels in the route J2 illustrated in FIG. 3. For positional adjustment in the route J2, the difference (L6−L4) is used as a substitute to adjust the third recording sheet P3 instead of the difference (L3−L1) of the second recording sheet P2.

Respective positions of recording sheets following the third recording sheet P3 are adjusted using the same processes described above.

Specifically, the position of an Nth recording sheet is adjusted by using detected positional information obtained for an (N−1)th recording sheet. However, as an alternative way of positional adjustment of the Nth recording sheet, an average amount of positional deviations from the first recording sheet P1 to the (N−1)th recording sheet in the route J2 is obtained as a distance for positional adjustment of the Nth recording sheet.

Further, the positional adjustment is not limited to a continuous printing operation of serial recording sheets. For example, the amount of positional deviation detected in the previous (or past) image formation is stored so that the detected amount can be used in the present (or current) image formation.

In the above-described alternative positional adjustments, the difference (L3−L1) can be replaced with the average amount of positional deviation of the stored positional information.

It is preferable that each amount of positional deviation according to different sizes of the recording sheet P to be printed is stored as the amount of positional deviation. Amounts of positional deviation vary depending on the sizes of recording sheets. By storing the respective amounts of positional deviation of the sizes of different recording sheets, the position of a recording sheet can be adjusted more precisely.

It is also applicable that, in a case in which multiple recording sheets having different sizes are printed, the stored amounts of former (or past) positional deviation of the recording sheets are cleared to store an amount (or a new amount) of current (or present) positional deviation of a single recording sheet.

As described in this disclosure, by employing detected amounts of positional deviation of the first recording sheet P1 obtained in the previous image formation, the position of the second recording sheet P2 is adjusted based on the difference (L5−L4)+(L3−L1). Consequently, the positional deviation of the recording sheet P detected during sheet conveyance from the route J1 to the route J2 can be adjusted. When compared with the first recording sheet P1 whose position is adjusted in sheet conveyance along the route J1, this positional adjustment can cover a range closer to the image transfer position B. As a result, more accurate positional adjustment can be performed.

Here, another configuration is assumed that the registration roller pair 80 disposed in the sheet conveying path 70 functions as an adjuster. Specifically, the configuration is to perform positional adjustment that covers a range closer to the image transfer position B than the above-described configuration. In this configuration, after the first sensor 101 has detected the position of the recording sheet P, the registration roller pair 80 used as an adjuster moves to adjust the position thereof.

However, in this configuration, depending on a length of the sheet conveying path 70 and a size of the recording sheet P on which an image is formed, when the leading end of the recording sheet P reaches the registration roller pair 80, the trailing end of the recording sheet P remains in the sheet feeding part 6. Therefore, the recording sheet P is pressed against a sheet stack by being sandwiched between the sheet feed roller 60.

In this case, even if the registration roller pair 80 successfully adjusts the position of the leading end of the recording sheet P, the trailing end of the recording sheet P cannot be moved. Consequently, the positional adjustment cannot be performed correctly, wrinkle or crease can be formed on the recording sheet P, and other various inconvenience can occur. In order to address the above-described inconveniences, a relatively long sheet conveying path 70 is provided, and therefore the size of the image forming apparatus 1 increases.

Figure 5:
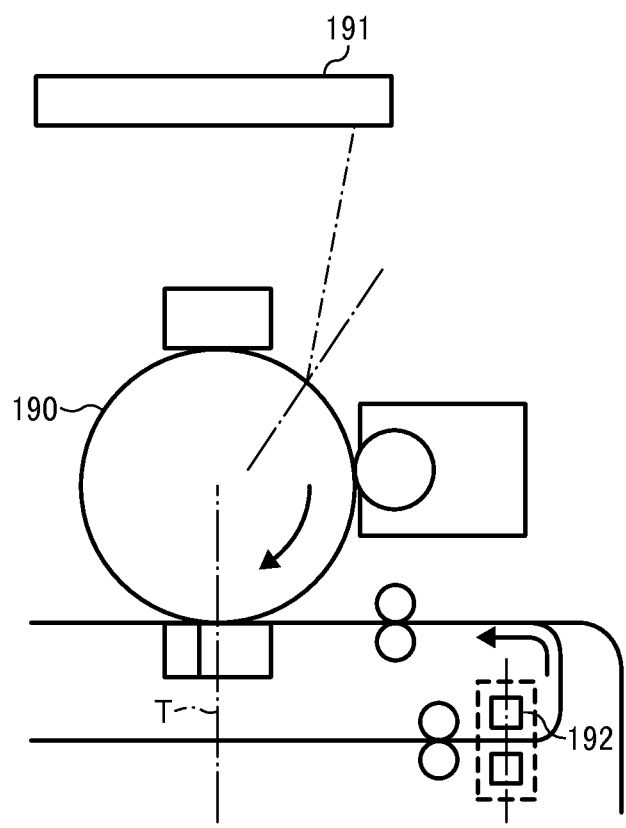
FIG. 5 is a drawing illustrating a schematic configuration of a known image forming apparatus according to a comparative example.

Specifically, a comparative example of the known image forming apparatuses shows a configuration as illustrated in FIG. 5. As illustrated in FIG. 5, the known image forming apparatus according to this comparative example includes an exposure device 191 to optically write an image onto a photoconductor 190 that rotates in a direction indicated by an arrow depicted therein. By adjusting a writing start position in a main scanning direction of the exposure device 191, an image forming position of the recording medium can be corrected. The known image forming apparatus according to this comparative example illustrated in FIG. 5 further includes a deflection sensor 192 to detect deflection information of the image forming position. Based on the deflection information obtained by the deflection sensor 192, the optical writing position of the exposure device 191 is adjusted, so that a position of a toner image formed on the photoconductor 190 is corrected. By so doing, the position of the image to be transferred at a transfer position T onto the recording medium that is conveyed in a direction indicated by arrow in FIG. 5 is adjusted.

In this comparative example, however, the exposure device 191 starts optical writing after the deflection sensor 192 has detected deflection information of the recording medium, and therefore the start of optical writing by the exposure device 191 is performed in synchronization with conveyance of the recording medium. It takes a relatively long time from that the exposure device 191 starts optical writing to the photoconductor 190 to develop an image thereon to that the toner image formed on the photoconductor 190 reaches the transfer position T. This time and a time from that the recording medium passes the deflection sensor 192 to that the recording medium reaches the transfer position T are required to set to meet. In order to do so, a relatively long sheet conveying path form the deflection sensor 192 to the transfer position T is provided, and therefore the deflection sensor 192 cannot be located near the transfer position T. Consequently, precision in deflection correction deteriorates. Further, if the image forming apparatus has a configuration in which the recording medium is stopped temporarily in order to meet the times, a speed in image formation of the image forming apparatus is likely to be reduced.

By contrast, the configuration according to this disclosure includes an adjuster in the sheet reversing path 72, at which the position of the recording sheet P is adjusted. The sheet conveying path provided for printing the back of a recording sheet in duplex printing is generally long. This disclosure can eliminate the above-described inconvenience, and consequently can prevent an increase in size of the image forming apparatus 1 and provide high accuracy of positional adjustment of the recording sheet.

Specifically, the configuration according to this disclosure performs positional adjustment by using the positional information of a preceding recording sheet (i.e., the first recording sheet P1) in the route J2. Therefore, on arrival of a subsequent recording sheet (i.e., the second recording sheet P2) at the detection position of the second sensor 102, as illustrated in FIG. 4(c), the amount of positional deviation caused by sheet conveyance of the subsequent recording sheet in the routes J1 and J2 can be adjusted. According to this configuration, positional adjustment of the second recording sheet P2 in the route J2 can be performed without waiting detection performed the first sensor 101 after the second recording sheet P2 has reached the first sensor 101 when printing the back of the second recording sheet P2 in duplex printing (FIG. 4(e)). Accordingly, this configuration can include an adjuster on the sheet reversing path 72 and can secure accuracy of positional adjustment of the recording sheet P.

Further, in the image forming apparatus 1 according to this example, the position of the recording sheet P in the route J2 cannot be adjusted during image formation of the first recording sheet P1. However, positional adjustment by the difference in the routes J1 and J2 can be performed with respect to each recording sheet to be printed in a configuration in which a test image is printed on the first recording sheet and a target image is printed on the second and subsequent recording sheets.

Next, a description is given of the image forming apparatus 1 that performs different positional adjustment of the recording sheet P according to another example of this disclosure.

The image forming apparatus 1 according to this example provides a configuration in which the image forming position of the recording sheet P is adjusted by adjusting an image writing position of the optical writing device 2 to the photoconductor belt 30.

Specifically, instead of the first shift roller pairs 110 and the second shift roller pairs 111, each functioning as an adjuster in the previous example, the optical writing device 2 and a controller 500 that controls the optical writing device 2 function as an adjuster in this example.

It is to be noted that units and components provided in the configuration according to this example are identical to those in the configuration according to the previous example of this disclosure, except for the above-described adjuster according to this example.

The optical writing device 2 is connected to the controller 500. The controller 500 adjusts the image writing position of the optical writing device 2 based on detection results obtained by the first sensor 101 and the second sensor 102.

In a case in which serial image formation is performed in the process as illustrated in FIGS. 2(a) through 2(f) and 4(a) through 4(f), when an image is printed on the front of the first recording sheet P1, the first recording sheet P1 passes by the first sensor 101, where the position L1 in the width direction of the first recording sheet P1 is detected. Then, when printing the same or different image on the back of the first recording sheet P, the first recording sheet P1 is conveyed to the sheet reversing path 72. When the second recording sheet P2 reaches the second sensor 102, the second sensor 102 detects the position L2 in the width direction of the first recording sheet P1. Positional information obtained by the first sensor 101 and the second sensor 102 are transmitted to the controller 500. The controller 500 adjusts the image writing position of the optical writing device 2 by moving the image writing position to the correct direction by the difference (L2−L1) in the width direction of the photoconductor belt 30. Then, the optical writing device 2 emits laser light to the photoconductor belt 30.

By contrast, after the first sensor 101 has detected the position L3 of the first recording sheet P1, the first recording sheet P1 is conveyed to the transfer position B, where the image is transferred onto the photoconductor belt 30 whose image writing position has been adjusted by the difference (L2−L1). As described above, the image forming position on the back of the recording sheet P can be adjusted.

Similar to the previous example of this disclosure, the configuration according to this example uses the positional information of the first recording sheet P1 to adjust the position of the second recording sheet P2 is adjusted by the distance (L5−L4)+(L3−L1). In this example, similar to the positional adjustment of the first recording sheet P1, an image is optically written after the image writing position of the optical writing device 2 is shifted by the distance (L5−L4)+(L3−L1). By so doing, the image transfer position of the second recording sheet P2 is adjusted.

Accordingly, the configuration according to this example as well as the configuration according to the previous example can adjust the image forming position of the optical writing device 2 for correcting the image forming position immediately after the detection performed by the second sensor 102.

A series of processes for adjusting the image writing position of the optical writing device 2 takes time. Specifically, the positional adjustment of the optical writing device 2 is performed in the order that the image writing position is adjusted, laser light is emitted to the photoconductor belt 30, toner is supplied to the surface of the photoconductor belt 30 from the developing device 31, a toner image is formed and born on the surface of the photoconductor belt 30, and the toner image on the surface of the photoconductor belt 30 reaches an opposing position facing the transfer device 4.

Due to the above-described series of processes, with the configuration in which the first sensor 101 disposed near the transfer position B firstly performs detection of positional deviation of the recording sheet P, and then positional adjustment of the image writing position of the optical writing device 2 starts based on detection results obtained by the first sensor 101, the optical writing device 2 starts optical writing before the recording sheet P reaches the transfer device 4, and therefore it takes a long time for the toner image formed on the photoconductor belt 30 to reach the opposing position to the transfer device 4.

In order to prevent this inconvenience, the configuration of a comparative example performs positional adjustment based on the positional information obtained by the second sensor 102 that is disposed away from the transfer position B. However, this operation cannot cover positional adjustment of the recording sheet P in a range of from the second sensor 102 to the transfer position B, which is the route J2 in FIG. 3.

Figure 6:
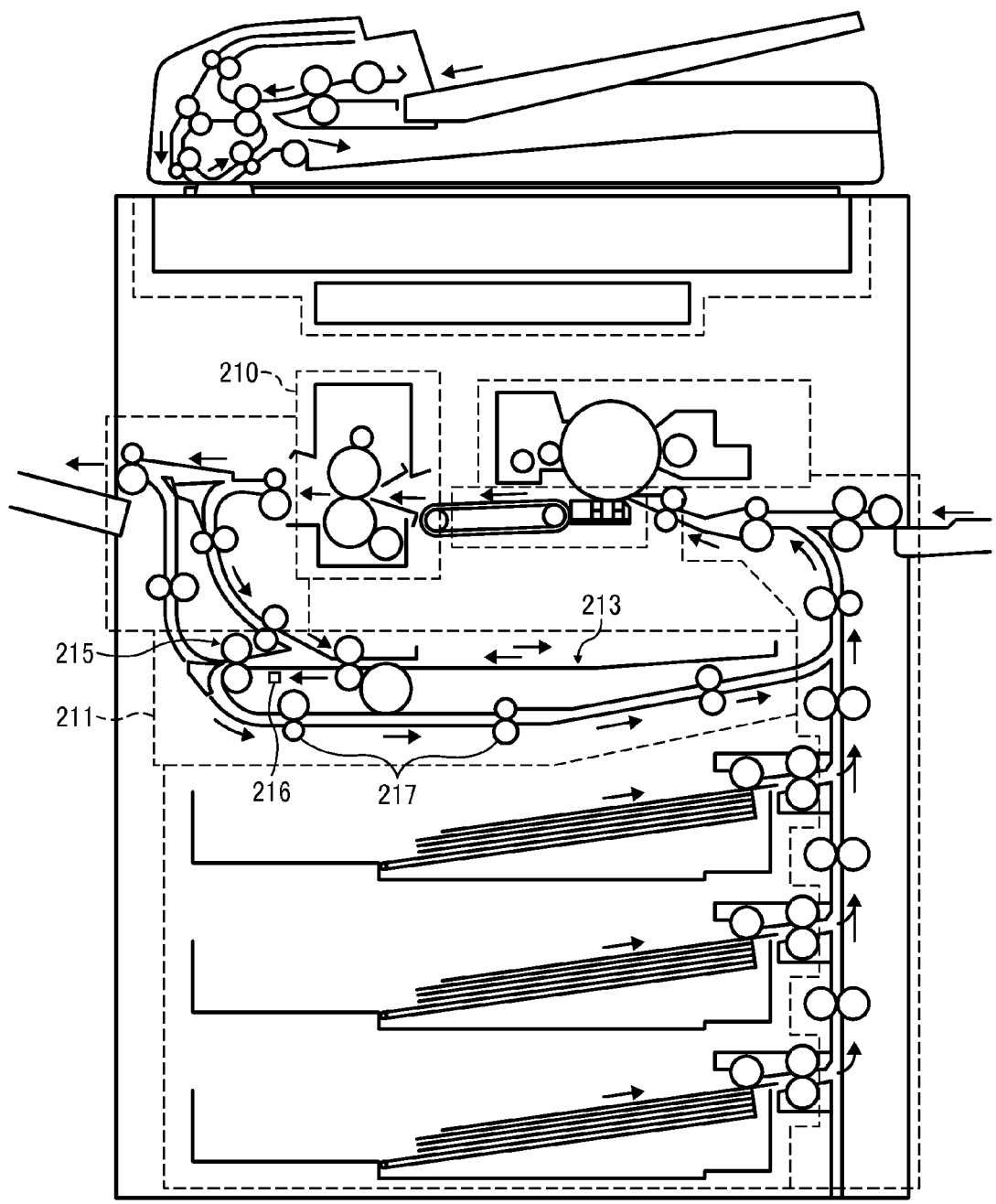
FIG. 6 is a drawing illustrating a schematic configuration of another known image forming apparatus according to another comparative example.
Figure 7:
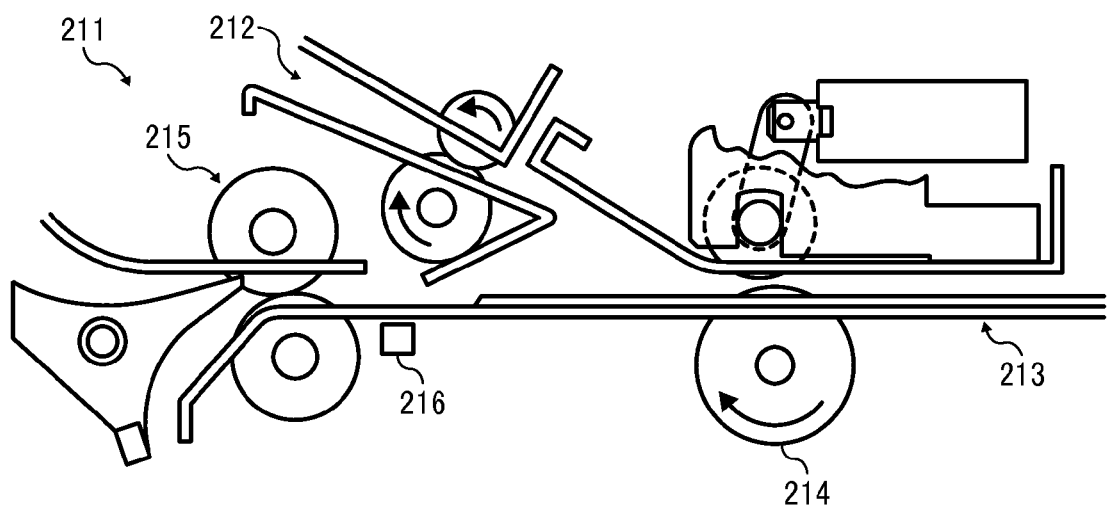
FIG. 7 is a drawing illustrating a schematic configuration of the known image forming apparatus of FIG. 6.

Specifically, another example of the known image forming apparatuses shows a configuration as illustrated in FIGS. 6 and 7. As illustrated in FIG. 6, the known image forming apparatus includes a duplex printing unit to which a recording medium is conveyed in duplex printing. The duplex printing unit includes a shift roller pair 215 to shift the recording medium in a width direction thereof. By shifting the recording medium, an image transfer position can be corrected. As illustrated in FIG. 7, the known image forming apparatus further includes a fixing device 210, a sheet reversing device 211, a sheet reversing path 212, an interim tray 213, a reverse roller 214, a sheet detector, and a sheet conveying roller 217. In the fixing device 210, the image is fixed to a front side of the recording medium. Then, the recording medium is conveyed to the sheet reversing device 211.

As illustrated in FIG. 7. the recording medium is then conveyed to the sheet reversing path 212 to be stored in the interim tray 213 temporarily. The reverse roller 214 that is disposed at a lower part of the interim tray 213 rotates in an opposite direction to a direction in which the recording medium is conveyed to the interim tray 213. By so doing, the recording medium is conveyed to the shift roller pair 215. The sheet detector 216 is disposed near the shift roller pair 215 to detect the position in the width direction (in a front-back direction in the drawing) of the recording medium, which is a direction perpendicular to a sheet conveying direction. The shift roller pair 215 shifts the recording medium in the width direction based on positional information detected by the sheet detector 216, so that the width position of the recording medium before the recording medium is conveyed to the sheet conveying roller 217.

In this comparative example, the sheet detector 216 is provided near the shift roller pair 215 to reverse the sheet for duplex printing. Therefore, a position shift of the recording medium from the sheet detector 216 to the transfer position T cannot be detected. Accordingly, similar to the previously described comparative example, it is also difficult to obtain good precision in correction of the position of the recording medium.

Different from the previously described condition in which the image forming part corrects the position, this configuration in which the position of the recording medium is shifted allows the sheet detector to be disposed near the transfer position. However, in order to correct the position based on detected positional information obtained by the sheet detector, the shift roller pair 215 is required to be disposed near the transfer position, which has a limitation.

According to the reasons described above, the position of the recording sheet cannot be adjusted based on positional information obtained by a sensor disposed near the transfer position B, and therefore there was an issue in accuracy of positional adjustment.

However, in this example as well as the previous example according to this disclosure, by using positional information detected during the previous image formation in the route J2, positional adjustment of the recording sheet P at the second sensor 102 can be performed without waiting detection performed by the first sensor 101 when forming an image on the back of the recording sheet. In addition, positional adjustment of the image writing position of the optical writing device 2 can be performed by including former (or post) position information of the recording sheet obtained by the first sensor 101 immediately before transfer of the image. Accordingly, the above-described inconvenience can be eliminated, and therefore accuracy of positional adjustment can be enhanced.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. An image forming apparatus comprising:
    an image bearer;
    a transfer device configured to transfer an image formed on the image bearer onto a first recording medium having a first side and a second side;
    a first detector and a second detector, the second detector in a different position than the first detector, the first detector and the second detector configured to detect positional information of the first recording medium on or near a recording medium conveying path, the first detector is configured to detect a first amount of positional deviation of the first recording medium in an image formation, the second detector is configured to detect a second amount of positional deviation of the first recording medium in the image formation and the first detector is configured to detect a third amount of positional deviation of the first recording medium in the image formation after the second detector detects the second amount of positional deviation, the positional information of the first recording medium including the first amount of positional deviation, the second amount of positional deviation and the third amount of positional deviation;
    the first detector being closer to the transfer device than the second detector in a sheet conveying direction on the recording medium conveying path; and
    an adjuster configured to adjust a position at which the first recording medium receives the image formed on the image bearer based on at least one of former positional information obtained by the first detector in a previous image formation and the positional information obtained by the second detector in the image formation, the former positional information obtained by the first detector including a former first amount of positional deviation and a former third amount of positional deviation.

2. The image forming apparatus according to claim 1, wherein the adjuster is configured to adjust the position of the first recording medium by shifting the first recording medium in a direction perpendicular to the sheet conveying direction on the recording medium conveying path.

3. The image forming apparatus according to claim 2,
    wherein the recording medium conveying path includes a sheet reversing path through which the first recording medium is conveyed when the image is formed on the second side of the first recording medium in duplex printing,
    wherein the adjuster and the second detector are on or near the sheet reversing path, and
    wherein the adjuster is configured to adjust a position of the second side of the first recording medium based on the positional information from the first detector.

4. The image forming apparatus according to claim 3,
    wherein a first image formation is on first and second sides of the first recording medium and a second image formation is on first and second sides of a second recording medium after the first image formation,
    wherein the first detector is configured to detect positional information of the first side of the first recording medium as the first amount of positional deviation and the second detector is configured to detect positional information of the second side of the first recording medium as the second amount of positional deviation in an image formation,
    wherein the first detector is configured to detect positional information of the first side of the second recording medium as a third amount of positional deviation and the second detector is configured to detect positional information of the second side of the second recording medium as a fourth amount of positional deviation in the second image formation, and
    wherein the adjuster is configured to adjust a position of the second recording medium based on a first difference between the first and second amounts of positional deviation and a second difference between the third and fourth amounts of positional deviation.

5. The image forming apparatus according to claim 2,
    wherein a first image formation is on first and second sides of the first recording medium and a second image formation is on first and second sides of a second recording medium after the first image formation,
    wherein the first detector is configured to detect positional information of the first side of the first recording medium as the first amount of positional deviation and the second detector is configured to detect positional information of the second side of the first recording medium as the second amount of positional deviation in the first image formation,
    wherein the first detector is configured to detect positional information of the first side of the second recording medium as a third amount of positional deviation and the second detector is configured to detect positional information of the second side of the second recording medium as a fourth amount of positional deviation in the second image formation,
    wherein the adjuster is configured to adjust a position of the second recording medium based on a first difference between the first and second amounts of positional deviation and a second difference between the third and fourth amounts of positional deviation.

6. The image forming apparatus according to claim 1,
wherein the adjuster and the second detector are on or near a sheet reversing path of the sheet conveying path, the sheet reversing path configured to convey the first recording medium when the image is on the second side of the first recording medium in duplex printing, and the adjuster is configured to adjust the position of a second side of the first recording medium based on the first amount of positional deviation.

7. The image forming apparatus according to claim 6,
wherein a first image formation is on first and second sides of the first recording medium and a second image formation is on first and second sides of a second recording medium after the first image formation, wherein the first detector is configured to detect positional information of the first side of the first recording medium as the first amount of positional deviation and the second detector is configured to detect positional information of the second side of the first recording medium as the second amount of positional deviation in the first image formation, wherein the first detector is configured to detect positional information of the first side of the second recording medium as a third amount of positional deviation and the second detector is configured to detect positional information of the second side of the second recording medium as a fourth amount of positional deviation in the second image formation, wherein the adjuster is configured to adjust a position of the second recording medium based on a first difference between the first and second amounts of positional deviation and a second difference between the third and fourth amounts of positional deviation.

8. The image forming apparatus according to claim 1,
wherein an average amount of positional deviations from a first recording medium image formation to an N−1th recording medium image formation is used as a distance for positional adjustment of an Nth recording medium image formation.

9. The image forming apparatus according to claim 1, wherein the adjuster includes shift rollers.

10. The image forming apparatus of claim 1, wherein the first and second detectors are on different portions of the recording medium conveying path of the image forming apparatus.

11. The image forming apparatus of claim 10, wherein the different portions include a forward conveying path and a reverse conveying path.

12. A method of positional adjustment in image formation comprising:
detecting a first amount of positional deviation of a first recording medium by a first detector at a first position in a recording medium conveying path in a first image formation, the first recording medium having a first side and a second side;

detecting a second amount of positional deviation of the first recording medium by a second detector at a second position arranged downstream from the first position in the recording medium conveying path in a second image formation;

detecting a third amount of positional deviation of the first recording medium by the first detector after detecting the second amount of positional deviation in the second image formation; and adjusting a position of the first recording medium before transferring an image in the second image formation based on the first amount of positional deviation and the second amount of positional deviation of the second side in the second image formation, wherein the second detector is in a different position than the first detector.

13. The method of positional adjustment in image formation according to claim 12, further comprising:
shifting the first recording medium in a direction perpendicular to a sheet conveying direction; and moving the first recording medium in the perpendicular direction.

14. The method of positional adjustment in image formation according to claim 12, further comprising:
forming an image on a first side of the first recording medium;

forming an image on a second side of the first recording medium in duplex printing; and adjusting a detection position of the second side of the first recording medium based on a detection position of the first side of the first recording medium.

15. The method of positional adjustment in image formation according to claim 14, further comprising:
performing third and fourth image formations on first and second sides of a second recording medium, respectively, after the second image formation;

obtaining a fourth amount of positional deviation of the first side of the second recording medium and a fifth amount of positional deviation of the second side of the second recording medium in the third image formation; and adjusting the position of the second recording medium based on a first difference between the first and second amounts of positional deviation and a second difference between the fourth and fifth amounts of positional deviation.

16. An image forming apparatus comprising:
at least two detectors configured to detect positional information of a first recording medium, the first recording medium having a first side and a second side, a first detector of the at least two detectors configured to detect a first amount of positional deviation of a first side of the first recording medium before receiving a first image on the first side of the first recording medium and a second detector of the at least two detectors configured to detect a second amount of positional deviation of the second side of the first recording medium before receiving a second image on the second side of the recording medium, the first detector further configured to detect a third amount of positional deviation of the first recording medium after the second detector detects the second amount of positional deviation; and an adjuster configured to adjust at least one of a position of the first recording medium before receiving the second image on the second side based on the first amount of positional deviation and the second amount of positional deviation and a position of a second recording medium based on the first and third amounts of positional deviation, wherein the second detector is in a different position than the first detector.

17. The image forming apparatus according to claim 16, wherein the adjuster is configured to adjust the position of the first recording medium by shifting the first recording medium in a direction perpendicular to a sheet conveying direction on a recording medium conveying path.

18. The image forming apparatus according to claim 17, wherein the adjuster and the second detector of the at least two detectors are on or near a sheet reversing path of the sheet conveying path, the sheet reversing path configured to convey the first recording medium when the image is on the second side of the first recording medium in duplex printing.

19. The image forming apparatus according to claim 18, wherein a first image formation is on the first and second sides of the first recording medium and a second image formation is on first and second sides of the second recording medium after the first image formation, the first detector is configured to detect a fourth amount of positional deviation of the first side of the second recording medium and the second detector is configured to detect a fifth amount of positional deviation of the second side of the second recording medium in the second image formation, wherein the adjuster is configured to adjust the position of the second recording medium based on a first difference between the first and second amounts of positional deviations and a second difference between the fourth and fifth amounts of positional deviations.

* * * * *